United States Patent [19]

Kobayashi

[11] Patent Number: 5,583,598

[45] Date of Patent: Dec. 10, 1996

[54] FILM CARTRIDGE LOADING MECHANISM FOR PHOTOGRAPHIC CAMERA

[75] Inventor: Kiyotaka Kobayashi, Saitama-ken, Japan

[73] Assignees: Fuji Photo Optical Co., Ltd., Saitama-ken; Fugi Photo Film Co., Ltd., Kanagawa-ken, both of Japan

[21] Appl. No.: 619,338

[22] Filed: Mar. 21, 1996

[30] Foreign Application Priority Data

Mar. 22, 1995 [JP] Japan ................................. 7-062974

[51] Int. Cl.$^6$ ........................... G03B 17/02; G03B 17/26
[52] U.S. Cl. ........................................ 396/538; 396/513
[58] Field of Search ................................ 354/275, 288, 354/174

[56] References Cited

U.S. PATENT DOCUMENTS

| | | | |
|---|---|---|---|
| 5,155,514 | 10/1992 | Tamamura | 354/174 |
| 5,305,039 | 4/1994 | Dassero | 354/288 |
| 5,394,213 | 2/1995 | Hazama et al. | 354/288 |
| 5,483,310 | 1/1996 | Tanii et al. | 354/275 |
| 5,483,314 | 1/1996 | Lawther et al. | 354/174 |
| 5,495,310 | 2/1996 | Takatori | 354/288 |
| 5,500,705 | 3/1996 | Stephenson, III | 354/288 |
| 5,510,867 | 4/1996 | Wakabayashil | 354/288 |
| 5,526,084 | 6/1996 | Kataoka et al. | 354/275 |

*Primary Examiner*—A. A. Mathews
*Attorney, Agent, or Firm*—Sixbey, Friedman, Leedom & Ferguson, P.C.; Gerald J. Ferguson, Jr.

[57] ABSTRACT

In a photographic camera, a film cartridge having a roll film rolled around a spool in a cartridge body and a shutter member for opening and shutting a film exit slit is loaded in a cartridge chamber. A chamber lid is mounted on the camera to be swung between an opening position where it opens the entrance opening to the cartridge chamber and a closed position where it shuts the same. A spool pressing member provided on the inner side of the chamber lid pushes an end of the spool of the film cartridge at a predetermined pressure when the chamber lid is closed. An arm member is mounted on the inner side of the chamber lid at one end to be swung about the end away from and toward the chamber lid and urged away from the chamber lid by a spring at a pressure larger than the predetermined pressure. A pressing portion provided on the free end of the arm member pushes the cartridge body inward of the cartridge chamber as the chamber lid is swung toward the closed position while the pressing portion slides on the end face of the cartridge body with the arm member swung toward the chamber lid overcoming the force of the spring so that the pressing portion rests on an arm rest portion away from the cartridge body when the chamber lid reaches the closed position.

3 Claims, 5 Drawing Sheets

FILM CARTRIDGE LOADING MECHANISM FOR PHOTOGRAPHIC CAMERA

BACKGROUND OF THE INVENTION

1. Field of the Invention

This invention relates to a film cartridge loading mechanism for a photographic camera which uses a film cartridge having a film exit slit and a light-shielding shutter member for opening and shutting the film exit slit.

2. Description of the Related Art

Recently there has been proposed a novel film cartridge in which a roll film is entirely rolled to its leading end around a spool in a cartridge body having a film exit slit and a light-shielding shutter member for opening and shutting the film exit slit. In such a film cartridge, when the film exit slit is shut, the roll film is entirely rolled around a spool to its leading end and held in a light-tight fashion and the roll film is fed out of the cartridge body and rewound into the cartridge body with the film exit slit opened.

Further we have proposed a photographic camera which uses such a novel film cartridge, for instance, in Japanese Unexamined Patent Publication No. 6(1994)-99909. The photographic camera is provided with a cartridge chamber in which the novel film cartridge is loaded, a chamber lid which opens and shuts an entrance opening to the cartridge chamber, a spool drive member which is engaged with the spool of the film cartridge loaded in the cartridge chamber and rotates the spool to feed out and rewind the film from and into the cartridge body, and a shutter opening member which is engaged with the light-shielding shutter member of the film cartridge and opens and shuts the film exit slit.

The camera and the film cartridge of these types are advantageous in that film loading is facilitated.

In the novel film cartridge, there is provided a lock member which prevents accidental opening of the light shielding shutter member when the film cartridge is handled outside the camera body. The lock member locks the rotary shaft of the shutter member to prevent rotation of the shutter member about the rotary shaft and releases the rotary shaft when an end of the rotary shaft of the shutter member is brought into engagement with the shutter opening member of the camera and the shutter opening member is brought into contact with the lock member.

In such a camera, the shutter member is released when the film cartridge loaded in the cartridge chamber is pushed inward and the shutter opening member deep in the cartridge chamber is brought into contact with the lock member pushed by the film cartridge. However when the chamber lid is shut with the film cartridge not loaded home in the cartridge chamber, the lock member sometimes cannot be correctly actuated and opening the light-shielding shutter member of the film cartridge becomes impossible.

However if the film cartridge is kept pushed with a large force in order to avoid such a problem, function of the novel film cartridge cannot be fully used.

SUMMARY OF THE INVENTION

In view of the foregoing observations and description, the primary object of the present invention is to provide a film cartridge loading mechanism in which a film cartridge can be surely loaded in place to release lock by the lock member and at the same time the film cartridge is urged with a proper force which ensures a good film feeding performance after the film cartridge is once loaded in the cartridge chamber.

The film cartridge loading mechanism in accordance with the present invention comprises a spool pressing member which is provided on the inner side of the chamber lid and pushes an end of the spool of the film cartridge at a predetermined pressure when the chamber lid is closed, an arm member which is mounted on the inner side of the chamber lid at one end to be swung about said one end in a plane substantially perpendicular to the chamber lid, a pressing portion provided on the other end of the arm member and adapted to be brought into contact with an end face of the cartridge body to be slidable on the end face when the chamber lid is swung to the closed position, and an urging means which urges the arm member in a direction in which the pressing portion is swung away from the chamber lid so that the pressing portion pushes the cartridge body at a pressure larger than said predetermined pressure at which the spool pressing member pushes the spool. The pressing portion is brought into contact with an outer end face of the cartridge body and pushes the cartridge body inward of the cartridge chamber as the chamber lid is swung toward the closed position while the pressing portion slides on the end face of the cartridge body with the arm member swung in a direction in which the pressing portion is moved toward the chamber lid overcoming the force of the urging means so that the pressing portion rests on an arm rest portion away from the cartridge body when the chamber lid reaches the closed position.

In one embodiment, a cartridge locator member having a cartridge insertion opening which is shaped to the film cartridge is fitted in the cartridge chamber at the entrance opening and the arm rest portion is a flat surface on the outer surface of the cartridge locator member.

It is preferred that the arm rest portion is positioned deeper in the cartridge chamber than the outer end face of the cartridge body loaded in the cartridge chamber in place.

In the film cartridge loading mechanism of the present invention, when a film cartridge is inserted into the cartridge chamber and the chamber lid is closed, the pressing portion is first brought into abutment against the outer or rear end face of the film cartridge and pushes inward the film cartridge with a large urging force, whereby the film cartridge is correctly positioned in the cartridge chamber, where the spool drive member is in engagement with the spool and the shutter opening member is in engagement with the shutter member with the lock by the lock member completely released.

As the chamber lid is swung toward the closed position, the arm member is swung toward the chamber lid while the pressing portion slides on the outer end face of the cartridge body pushing inward the cartridge body, and when the chamber lid is completely closed, the pressing portion rests on the arm rest portion away from the cartridge. In this state, the urging force of the arm member does not act on the cartridge and the cartridge is located in place by virtue of the spool pressing member.

Thus, even if the film cartridge is not fixed as it is inserted into the cartridge chamber, the film cartridge is pushed into the correct position and the lock of the shutter member is surely released by closing the chamber lid.

DESCRIPTION OF THE PREFERRED EMBODIMENT

Figure 1:
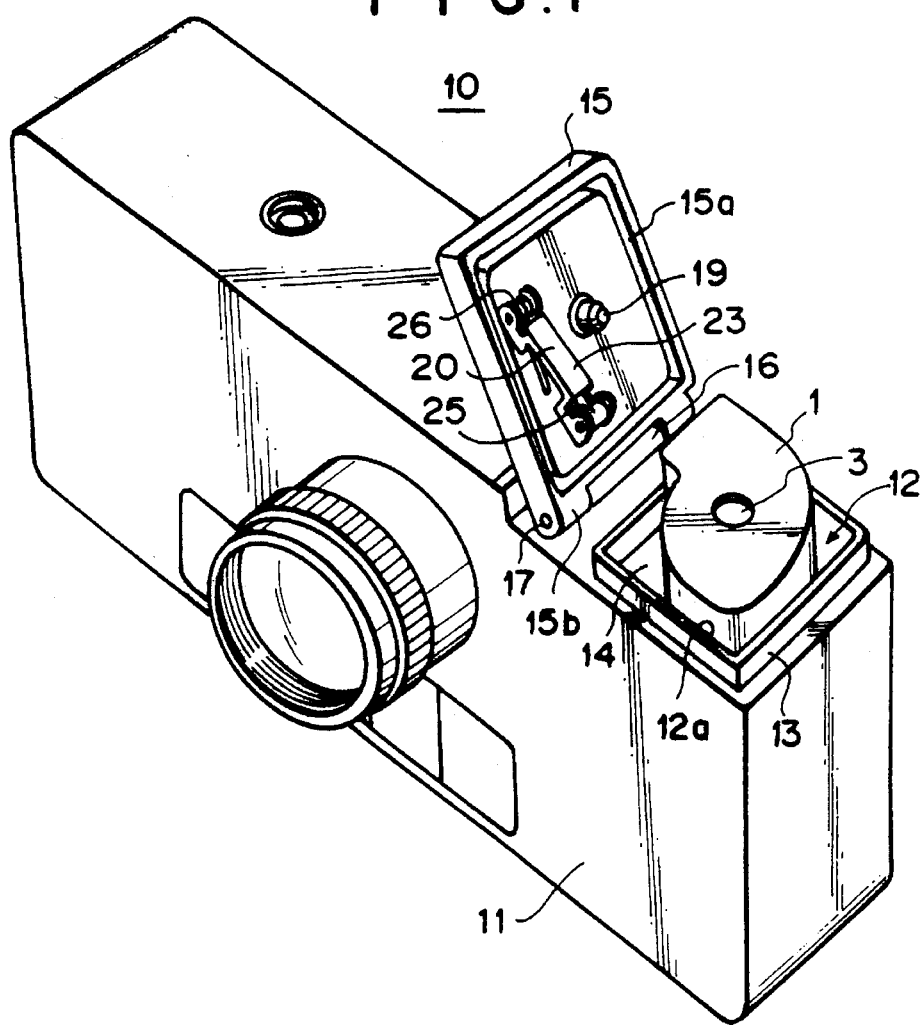
FIG. 1 is a perspective view showing upside down a photographic camera provided with a film cartridge loading mechanism in accordance with an embodiment of the present invention.
Figure 2:
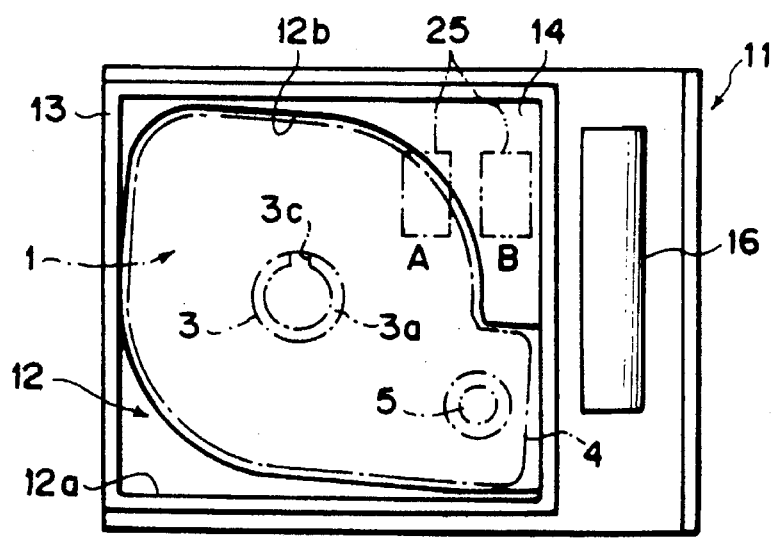
FIG. 2 is a bottom view showing the cartridge chamber of the camera.
Figure 3:
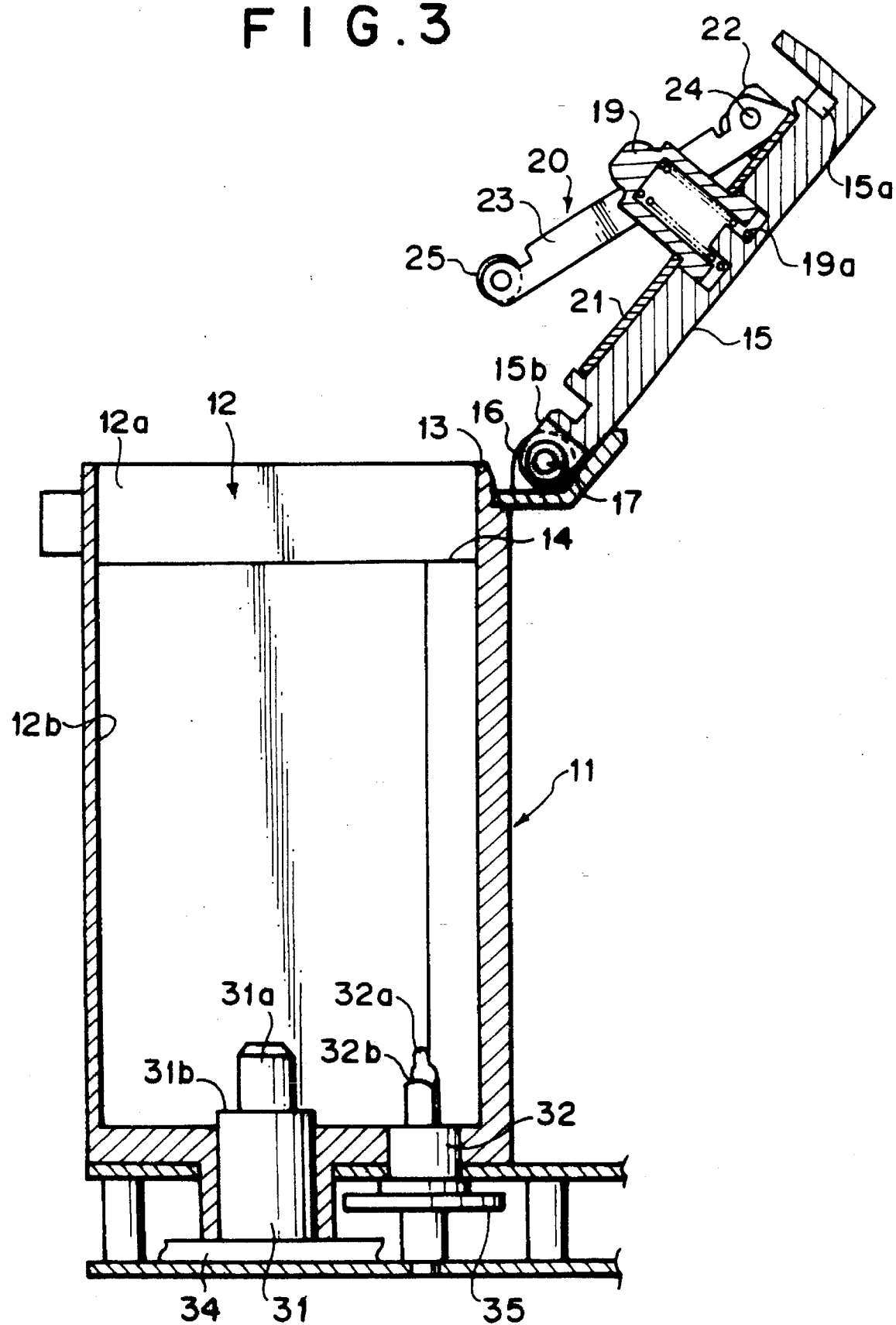
FIG. 3 is a cross-sectional view showing the cartridge chamber with the chamber lid opened.
Figure 4:
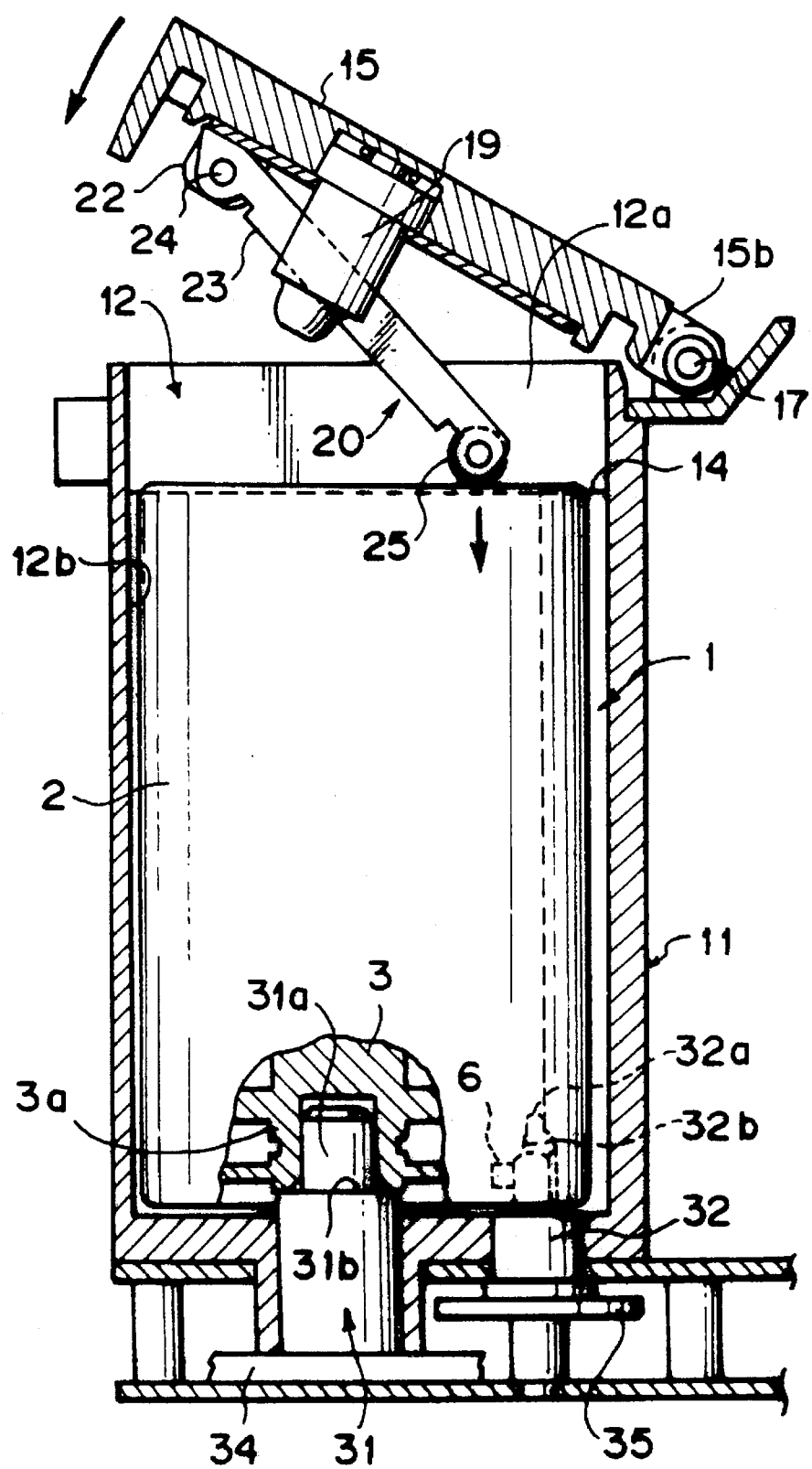
FIG. 4 is a cross-sectional view similar to FIG. 3 but with the chamber lid half shut.

In FIGS. 1 to 3, a photographic camera 10 has a cartridge chamber 12 formed in one side of a camera body 11. A film cartridge 1 such as shown in FIG. 7 is loaded in the cartridge chamber 12.

Figure 7:
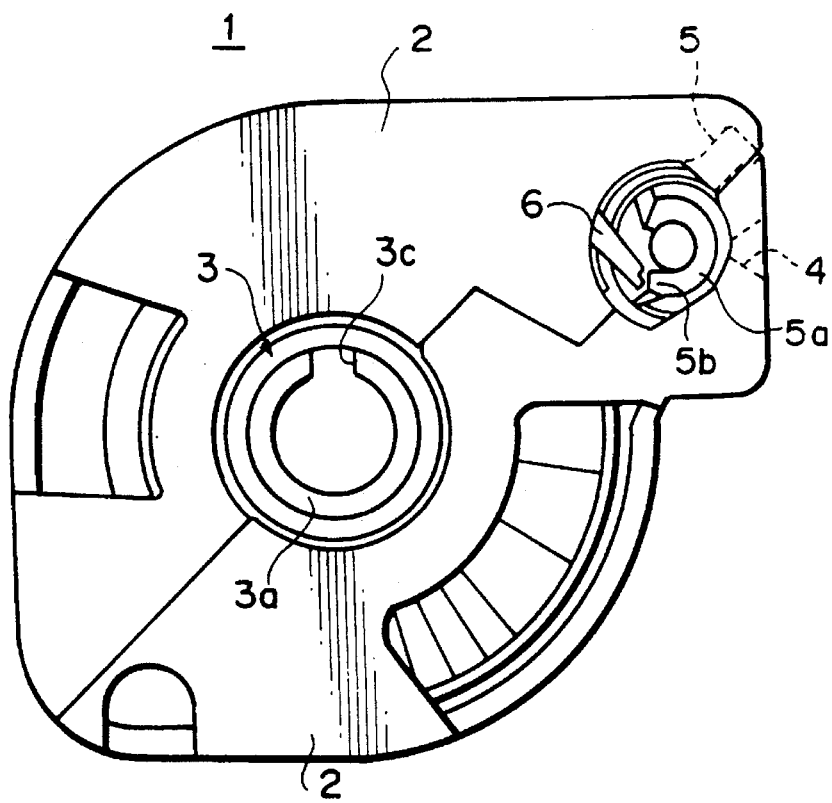
FIG. 7 is a bottom view showing an example of a film cartridge.

As shown in FIG. 7, comprises a cartridge body 2 formed of resin molding halves bonded together and a photographic roll film entirely rolled around a spool 3 in the cartridge body 2 to its leading end. A film exit slit 4 is formed in the side surface of the cartridge body 2 and a light-shielding shutter member 5 is supported for rotation in the film exit slit 4 to open and shut the film exit slit 4. The shutter member 5 extends in parallel to the spool 3 and is provided with a key 5b at its one end portion 5a. The key 5b is for rotating the shutter member 5 between an opening position where it opens the film exit slit 4 and a shutting position where it shuts the same.

A square entrance opening 12a to the cartridge chamber 12 is formed in the bottom of the camera body 10 and is opened and shut by a chamber lid 15. The cartridge chamber 12 is surrounded by light-shielding vertical wall 13. The chamber lid 15 is substantially square in shape and is provided with a square groove 15a on the inner side thereof. The groove 15a is fitted on the lower end portion of the vertical wall 13 when the chamber lid 15 is in a closed position where it shuts the entrance opening 12a. The chamber lid 15 is supported for rotation, between the closed position and an opening position where the chamber lid 15 opens the entrance opening 12a, about a pivot pin 17 extending through a side edge portion 15b of the chamber lid 15 and a support portion 16 formed along a side of the entrance opening 12a. In the closed position, the outer side of the chamber lid 15 forms a part of the bottom side of the camera by 10.

A spool pressing member 19 which is brought into engagement with an end 3b of the spool 3 of the film cartridge 1 and pressing inward the spool 3 is mounted on the inner side of the chamber lid 15 substantially at the center thereof. The pressing member 19 is movable toward and away from the spool 3 and is urged toward the spool 3 by a spring 19a built therein. The spring 19a has a force suitable for obtaining an urging force of about 100 g.

Figure 6:
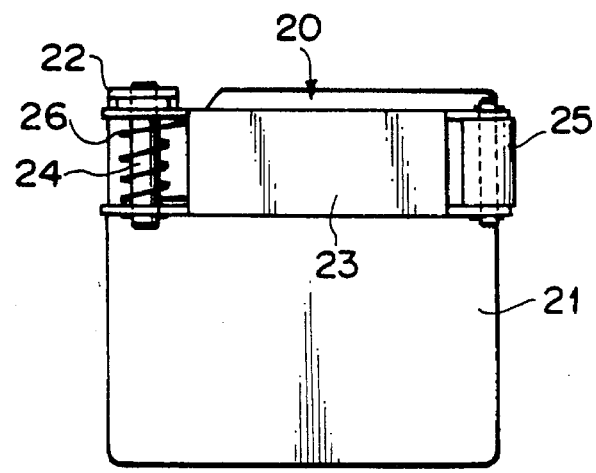
FIG. 6 is a bottom view of a cartridge pressing arm.

A cartridge pressing arm 20 is mounted on the inner side of the chamber lid 15 beside the spool pressing member 19. Referring also to FIG. 6, a cartridge locator member 14 having a cartridge insertion opening 12b which is shaped to the film cartridge 1 is fitted in the cartridge chamber 12 at the entrance opening 12a thereof. The upper surface of the cartridge locator member 14 is flat and is positioned slightly lower than the end surface of the cartridge body 2 when the film cartridge 1 is correctly loaded in the cartridge chamber 12. As will be described in detail later, the part of the upper surface of the cartridge locator member 14 adjacent to the projected portion of the cartridge body 2 in which the film exit slit 4 is provided and the cylindrical portion which merges into the projected portion by way of the recessed portion at the base of the projected portion provides an arm rest portion on which the cartridge pressing arm 20 rests when the chamber lid 15 is completely closed.

A spool drive member 31 and a shutter opening member 32 are provided on the inner end of the cartridge chamber 12. The base portion of the spool drive member 31 is larger in diameter than the free end portion of the same, and the free end portion forms an engagement portion 31a which is engaged with one end 3a of the spool 3 to drive the spool 3 for film feed out and film rewind. An annular shoulder 31b is formed between the engagement portion 31a and the base portion of the spool drive member 31 and the end 3a rests on the shoulder 31b, thereby positioning the film cartridge 1 in the longitudinal direction of the cartridge chamber 12. The spool drive member 31 is provided with a gear 34 byway of which the spool drive member 31 is driven to rotate the spool 3 in a regular direction and the reverse direction by an electric motor (not shown).

The shutter opening member 32 has a free end portion 32a adapted to be engaged with the key 5b of the light-shielding shutter member 5 of the film cartridge 1 and an inclined surface 32b which is brought into contact with the lock member 6 of the film cartridge 1 and moves the lock member 6 to a release position where the lock member 6 permits the shutter member 5 to be opened. The shutter opening member 32 is provided with a gear 35 by way of which the shutter opening member 32 is driven to open and shut the shutter member 5 by an electric motor (not shown).

The cartridge pressing arm 20 includes an arm member 23 which is pivoted on a pin 24 mounted on a bracket 22 which is mounted on a base plate 21 fixed to the inner side of the chamber lid 15. The arm member 23 is rotatable and rotation of the arm member 23 is limited. The bracket 22 is mounted on the inner side of the chamber lid 15 on the side remote from the pivot pin 17 of the chamber lid 15, and the arm member 23 extends from the bracket 22 toward the pivot pin 17 on the side of the spool pressing member 19 remote from the film exit slit 4.

A pressing roller 25 is mounted on the free end of the arm member 23 to be brought into contact with the end face of the cartridge body 2. The contact point of the pressing roller 25 moves with rotation of the arm member 23 and the length of the arm member 23 is set so that the pressing roller 25 is positioned on the upper surface of the cartridge locator member 14 when the chamber lid 15 is completely closed and the arm member. 23 is in parallel with the chamber lid 15.

That is, as shown in FIG. 2, the pressing roller 25 is first brought into contact with the end face of the cartridge body 2 in position A where a major part of the roller 23 is on the face of the cartridge body 2 with a part of the roller 23 held above the upper surface of the cartridge locator member 14. When the chamber lid 15 is completely closed, the whole roller 25 is positioned on the upper surface of the cartridge locator member 14 as indicated at B.

The upper surface of the cartridge locator member 14 is positioned slightly lower than the end surface of the cartridge body 2 when the film cartridge 1 is correctly loaded in the cartridge chamber 12 so that the pressing roller 25 can be positioned on the upper surface of the cartridge locator member 14 without interference with the edge of the cartridge insertion opening 12b even if no film cartridge 1 is in the cartridge chamber 12.

The arm member 23 is urged away from the inner side of the chamber lid 15 by a spring 26 fitted on the pin 24 so that an urging force of about 500 g (larger than that of the spool pressing member 19) is obtained at the pressing roller 25.

While the chamber lid 15 is rotated from the opening position shown in FIG. 3 to the closed position, the pressing roller 25 on the free end of the arm member 23 is brought into abutment against the end face of the cartridge body 2 (position A in FIG. 2), and as the chamber lid 15 is further rotated toward the closed position, the pressing roller 25 pushes inward the cartridge body 2 until the spool 3 is engaged with the engagement portion 31a of the spool drive member 31 with the end 3a of the spool 3 abutting against the shoulder 31b of the spool drive member 31 and at the same time the free end portion 32a is engaged with the key 5b of the light-shielding shutter member 5 of the film cartridge 1 with the lock member 6 of the film cartridge 1 moved to the release position.

Figure 5:
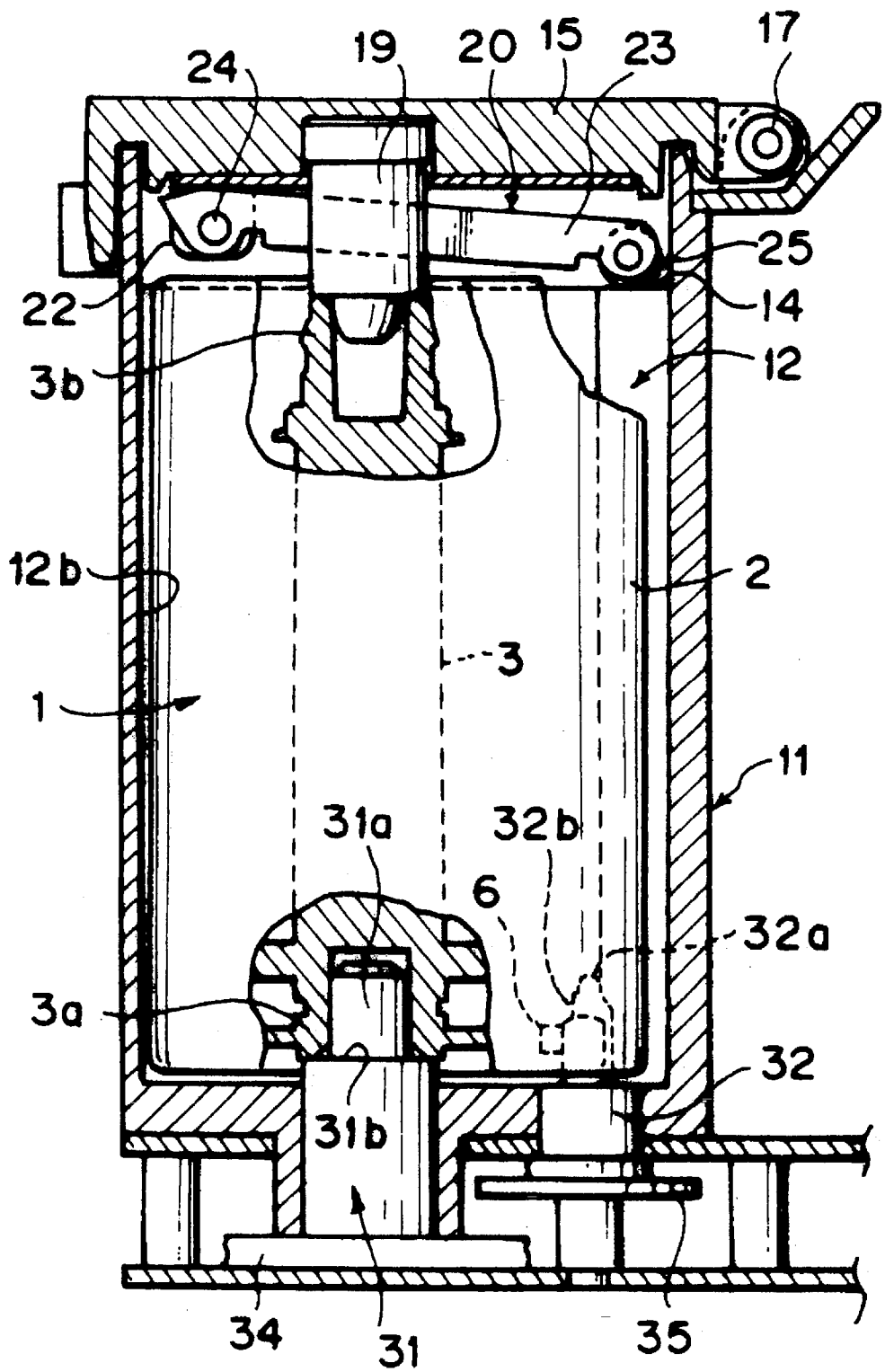
FIG. 5 is a cross-sectional view similar to FIG. 3 but with the chamber lid completely shut.

As the chamber lid 15 moves toward the closed position, the arm member 23 is rotated toward the inner side of the chamber lid 15 and the pressing roller 25 is moved along the end face of the cartridge body 2 and when the chamber lid 15 is completely closed, the pressing roller 25 is positioned away from the cartridge body 2 on the upper surface of the cartridge locator member 14 on the inner side of the cartridge body 2 as shown in FIG. 5. In this state, the urging force from the arm member 23 does not act on the cartridge body 2 and the spool 3 is positioned by the urging force of the spool pressing member 19 on the inner side of the chamber lid 15.

When the film cartridge 2 is taken out from the cartridge chamber 12 and the chamber lid 15 is closed without loading a film cartridge, a part of the pressing roller 25 abuts against the upper surface of the cartridge locator member 14 and is surely positioned on the upper surface of the locator member 14 when the chamber lid 15 is completely closed.

Though, in the embodiment described above, a roller 25 is mounted on the free end of the arm member 23 as a pressing portion, the pressing member may be of a structure other than the roller so long as the pressing member can slide along the end surface of the cartridge body 2 as the chamber lid 15 rotates toward the closed position.

What is claimed is:

1. In a photographic camera having a cartridge chamber in which is loaded a film cartridge having a roll film rolled around a spool in a cartridge body and a light-shielding shutter member for opening and shutting a film exit slit formed in the cartridge body, an entrance opening to the cartridge chamber, a chamber lid which is mounted on the camera to be swung between an opening position where it opens the entrance opening and a closed position where it shuts the entrance opening, a spool drive member which is engaged with the spool of the film cartridge loaded in the cartridge chamber and rotates the spool to feed out and rewind the film from and into the cartridge body, and a shutter opening member which is engaged with the light-shielding shutter member of the film cartridge and opens and shuts the film exit slit, a film cartridge loading mechanism comprising a spool pressing member which is provided on the inner side of the chamber lid and pushes an end of the spool of the film cartridge at a predetermined pressure when the chamber lid is closed, an arm member which is mounted on the inner side of the chamber lid at one end to be swung about said one end in a plane substantially perpendicular to the chamber lid, a pressing portion provided on the other end of the arm member and adapted to be brought into contact with an end face of the cartridge body to be slidable on the end face when the chamber lid is swung to the closed position, and an urging means which urges the arm member in a direction in which the pressing portion is swung away from the chamber lid so that the pressing portion pushes the cartridge body at a pressure larger than said predetermined pressure at which the spool pressing member pushes the spool, the pressing portion being brought into contact with an outer end face of the cartridge body and pushing the cartridge body inward of the cartridge chamber as the chamber lid is swung toward the closed position while the pressing portion slides on the end face of the cartridge body with the arm member swung in a direction in which the pressing portion is moved toward the chamber lid overcoming the force of the urging means so that the pressing portion rests on an arm rest portion away from the cartridge body when the chamber lid reaches the closed position.

2. A film cartridge loading mechanism as defined in claim 1 in which a cartridge locator member having a cartridge insertion opening which is shaped to the film cartridge is fitted in the cartridge chamber at the entrance opening and said arm rest portion is a flat surface on the outer surface of the cartridge locator member.

3. A film cartridge loading mechanism as defined in claim 2 in which said arm rest portion is positioned deeper in the cartridge chamber than the outer end face of the cartridge body loaded in the cartridge chamber in place.

\* \* \* \* \*

UNITED STATES PATENT AND TRADEMARK OFFICE
CERTIFICATE OF CORRECTION

PATENT NO.   : 5,583,598
DATED        : December 10, 1996
INVENTOR(S)  : Kiyotaka KOBAYASHI It is certified that error appears in the above-indentified patent and that said Letters Patent is hereby corrected as shown below:   On the title page:

[73]   Assignees:   Fuji Photo Optical Co., Ltd., Saitama-ken; Fuji Photo Film Co., Ltd., Kanagawa-ken, both of Japan Signed and Sealed this Sixteenth Day of September, 1997

Attest:

BRUCE LEHMAN

Attesting Officer

Commissioner of Patents and Trademarks